United States Patent Office 2,820,188
Patented Jan. 14, 1958

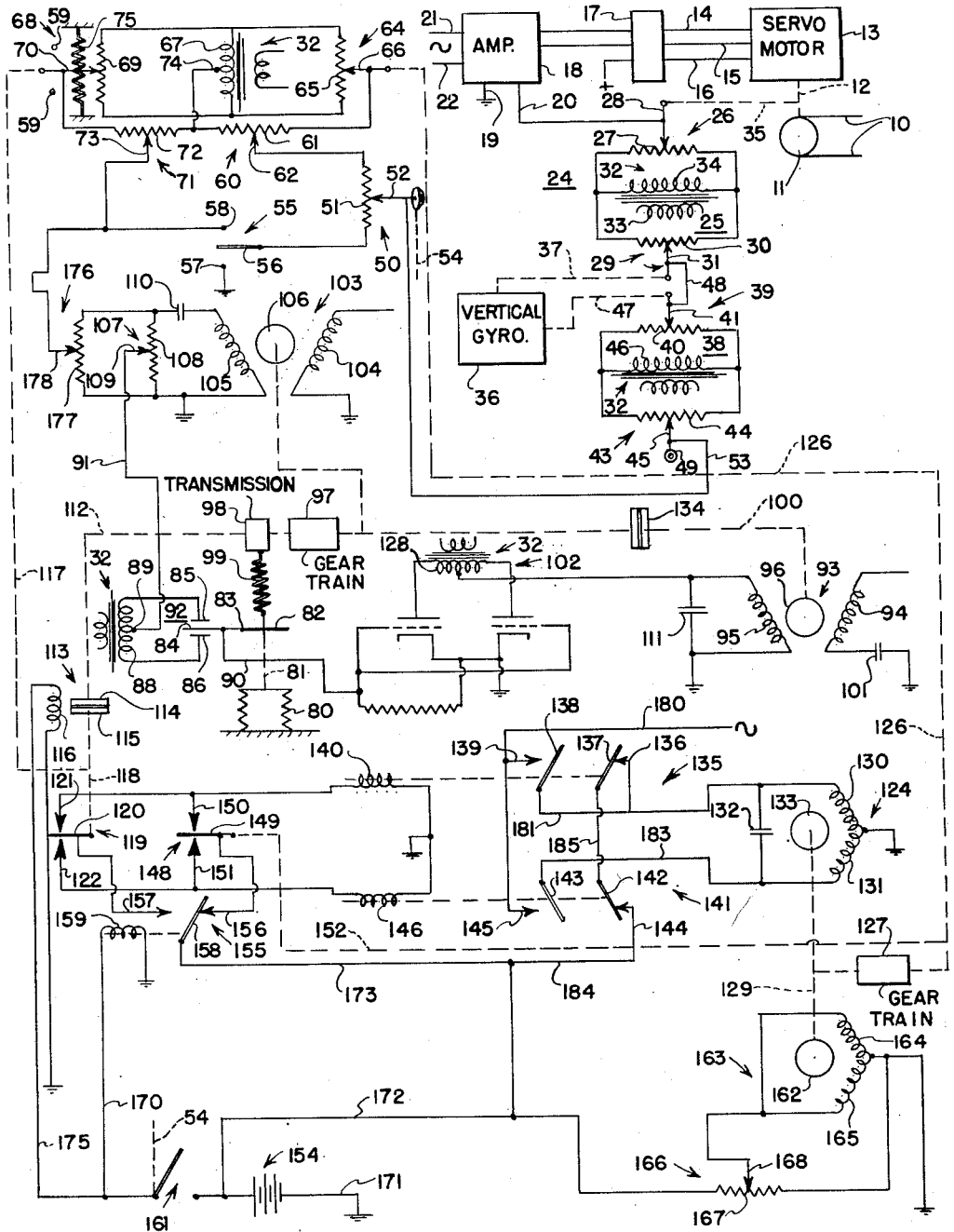

2,820,188

ALTITUDE CONTROL FOR AIRCRAFT

Robert J. Kutzler, Minneapolis, Minn., assignor to Minneapolis-Honeywell Regulator Company, Minneapolis, Minn., a corporation of Delaware Application January 29, 1951, Serial No. 208,391

19 Claims. (Cl. 318—489)

This invention pertains to automatic pilots for aircraft and more particularly to altitude control means therefor whereby the aircraft will be automatically maintained at an achieved altitude. Generally, level attitude of an aircraft is automatically maintained by controlling the elevator surface of an aircraft from a servo motor operated from a pitch take off actuated from a vertical gyroscope which responds to changes in pitch attitude of the aircraft.

While the gyroscope is effective to control level attitude of the aircraft through its pitch take off, it is not able to maintain the craft at a desired altitude since a change in such altitude may take place due to change in position of the center of gravity or due to up or down air currents without a change in the relation between the longitudinal axis of the gyroscope and the longitudinal axis of the aircraft.

In order to overcome this limitation of the vertical gyroscope, it has been proposed to control the servo motor that operates the elevator control surface from an altimeter in which the altimeter provides a control signal proportional to the magnitude of change in altitude.

In such an arrangement, signals proportional to the magnitude of change of altitude, of magnitude of change of attitude, and magnitude of operation of the servo motor are used in the positioning of the elevator. Such an arrangement has its disadvantages in that while the altimeter serves as a datum of the altitude of the aircraft and to which the aircraft is restored by the operation of the elevator, yet this original altitude is regained with the above arrangement only after several oscillations about the predetermined altitude, which oscillations are damped by the aerodynamic damping qualities of the aircraft. Additionally, the proportional control, where the elevator displacement is proportional to change in altitude, has a further disadvantage in that a decrease in weight of the aircraft such as that due to fuel consumption will set up a condition tending to cause the aircraft to increase its altitude permanently without necessarily increasing or changing its attitude. The proportional system above described does not compensate for such continuing conditions and the achieved altitude is not maintained.

An object of the present invention is to provide a novel and improved aircraft altitude controller in which the elevator surface is operated not only in accordance with the magnitude of change of altitude but also in accordance with the rate of change of altitude from a predetermined value to prevent hunting of said craft from said predetermined altitude upon changes therefrom taking place.

Another object of this invention is to provide an altitude controller for maintaining an aircraft at a predesired altitude including means for storing a signal developed by the continuation of a change in altitude, to prevent the change or deviation of altitude resulting due to a permanent effect tending to develop such change in the altitude of said craft.

It is a further object of the present invention to provide an improved apparatus for combining altitude and attitude control of an aircraft.

Another object of the present invention is to provide an improved arrangement for controlling the altitude of an aircraft.

The foregoing and other objects and advantages of the invention will appear more fully hereinafter from a reference to the detailed description which follows, taken together with the accompanying drawing which illustrates, by way of example, one embodiment of the invention.

The sole figure comprising the drawings is a diagrammatic circuit illustration of the elevator channel of an automatic pilot for an aircraft embodying the novel altitude controller of the present invention.

The altitude controller, briefly, and referring to the drawing, operates the elevator (not shown) of the aircraft by control cables 10 driven by a servo motor 13 which is reversibly controlled by an A. C. discriminator amplifier 18. The amplifier 18 is controlled from a balanceable alternating current network 24 in such manner that the direction of operation of the servo motor depends upon the phase of a resultant alternating voltage present in network 24. The network 24 includes a potentiometer bridge 25 whose unbalance is controlled by servo motor 13 and by movements of the craft about the roll axis sensed by vertical gyroscope 36. Network 24 includes an additional potentiometer bridge 38 controlled by movements of the aircraft about the pitch axis from vertical gyroscope 36 and the manually operable trim change controller 49. The network 24 finally includes a pilot's altitude control potentiometer 50 which is the portion of network 24 most closely associated with the altitude controller.

The pilot's control potentiometer 50 is energized from a rate of change of altitude authority voltage device 176, an altitude displacement authority voltage device 71, and a reset authority voltage device 60. The displacement and reset authority devices are in turn controlled respectively from displacement signal generator 68, and reset signal generator 64.

The reset signal generator 64 is positioned from a reset motor 124, which in turn is controlled through a single pole double throw switch 119. The displacement signal generator 68 and the arm of the switch in turn are positioned through a disengageable clutch 113 from an instrument rebalance motor 93. The motor also drives a velocity generator 103 for providing a rate of change signal to the rate of change authority device 176.

The rebalancing motor 93 is controlled from an A. C. discriminator amplifier 102. The balance of a control circuit for the amplifier is controlled by a primary pick-off 92, and an anti-hunt authority device 107. The primary pick-off has a sensitive element 84 pivoted intermediate its ends and positioned by a pressure responsive altimeter 80. Upon change in pressure, the altimeter adjusts the sensitive part of the pick-off which generates a voltage. This voltage operates the electronic amplifier 102 which in turn causes variable speed movement of the instrument rebalance motor 93. The motor through an operating arrangement 100, 97, 98 adjusts a force balance spring 99 to thereby return the sensitive part of the pick-off to unoperated position to zero the pick-off and simultaneously, with the clutch 113 engaged, operates the displacement signal generator 68 and the double throw switch 119 constituting a second pick-off. Coupled in driven relationship to the instrument motor 93 for simultaneous operation is a velocity generator 103 whose output is in series with pick-off 92 and whose output is also used to supply a voltage proportional to the rate of change of altitude.

When the altitude control is not used to control the aircraft, the rebalancing motor 93 merely nulls the primary pick-off 92 and the clutch 113 is opened to prevent movement of the double throw switch 119 and the displacement signal generator 68. With slider 52 moved to lower position at this time, network 24 by-passes fader potentiometer 50.

Returning to the automatic operating means for the elevator, as a preliminary to a more detailed description of the invention the servo motor 13 carries on its output shaft 12 a cable drum 11 from which the cables 10 extend. Leading to the servo motor 13 are three conductors 14, 15, and 16, one of which is used to energize the servo motor so that it may rotate in one direction, another may energize the servo motor so that it rotates in the opposite direction, and the third controls the engagement of the servo motor with the control cables 10 so that with neither of the first two conductors energized the servo motor will hold the adjusted elevator in substantially locked position. The servo motor 13 may be of the type disclosed in Patent 2,425,734 to Willis H. Gille et al. The conductors 14, 15, and 16 extend to an engage relay 17 which may be energized by any suitable means. In the out position of the relay the conductors 14, 15, and 16 are unenergized at which time the elevator may be manually operated. When the relay is in the in position, conductors 14 and 15 are energized alternatively from the output of the A. C. discriminator amplifier 18 upon operation thereof and the conductor 16 is energized from a source of direct voltage (not shown).

The amplifier 18 is of the phase sensitive or discriminator type being supplied with a control signal voltage across input connections 19 and 20 and being connected to a source of alternating supply voltage by conductors 21, 22. The energization of one or the other conductors 14, 15 with the relay 17 in the in position depends upon the phase relationship of the alternating voltage across signal input connections 19, 20 and the voltage across voltage input terminals 21, 22. The amplifier 18 may be such as disclosed in the aforesaid patent to Willis H. Gille et al.

In the control signal voltage generating network 24 for amplifier 18, the potentiometer bridge 25 comprises a follow-up or rebalance potentiometer 26 having a resistor 27 and a slider 28; a vertical gyro bank potentiometer 29 having a resistor 30 and a slider 31; and a transformer 32 having a primary winding 33 and a secondary winding 34. Resistors 27 and 30 are connected across a secondary winding 34 in parallel.

Slider 28 is operated from servo motor shaft 12 through a follow up operating connection 35. Conductor 20 extends from the amplifier 18 to slider 28. Slider 31 is positioned with respect to resistor 30 from a vertical gyroscope 36 in response to movements of the craft about the roll axis through the operating connection 37. The operating connection 37 is such that irrespective of the direction of roll of the aircraft the slider 31 is moved in the same direction so as to provide an up elevator signal as indicated by an arrow on the drawing.

The vertical gyroscope 36 is of the type well known in the art having a rotor supported in a casing and rotatable about a vertical axis. The casing in turn is supported in cross gimbals so that the casing has angular rotation about two respectively perpendicular horizontal axes.

The potentiometer bridge 38 comprises a pitch attitude potentiometer 39 having a resistor 40 and a slider 41; a trim potentiometer 43 having a resistor 44 and a slider 45; and a transformer 32 having a secondary winding 46. Since a transformer may have a single primary winding supplying several secondary windings, the separate secondary windings of the transformer are so indicated in the several potentiometer bridges and where otherwise desired.

The slider 41 is positioned with respect to resistor 40 in response to movements of the craft about the pitch axis from the vertical gyroscope 36 through the operating connection 47. A conductor 48 extends from slider 31 of the bank potentiometer 29 to slider 41. Potentiometer resistors 40 and 44 are connected in parallel across the secondary winding 46. Slider 45 is positioned along resistor 44, from a manually operable trim knob 49.

The pilot's control potentiometer 50 has a resistor 51 and a manually adjustable slider 52 with the operating connection 54. A conductor 53 extends from slider 45 to slider 52. The resistor 51 is associated with circuits by means of a single pole two position switch 55. The switch comprises an arm 56 and contacts 57, 58 in one position of switch arm 56, when it engages contact 57, the associated circuit of resistor 51 includes a reset authority voltage dividing potentiometer 60, a displacement authority potentiometer 71, and a rate of change of altitude authority potentiometer 176. With the switch arm 56 engaging contact 58, the circuit associated with resistor 51 includes the reset authority potentiometer 60 and the displacement authority potentiometer 71 only. These potentiometers 60, 71, 176 are energized with the craft changing altitude during altitude control and the immediate portion of the specification will therefore be concerned with the altitude sensing arrangement.

A pressure responsive altimeter 80, which may be of the aneroid type, responds to changes in the pressure of the atmosphere and through its operating connection 81 adjusts a lever 82 pivoted at 83. The opposite portion of the lever supports a sensitive element 84 which together with two opposed plates 85, 86 forms two capacitors which normally have the same capacitance. The plates 85, 86 are connected to opposite ends of a secondary winding 88 of transformer 32. A conductor 90 extends from the movable member 84 and a conductor 91 extends from a center tap 89 of secondary winding 88 to form the output members of altitude pick-off 92.

The lever 82 in addition to being positioned from the altimeter 80 is also placed in a rebalanced or null position by an operating arrangement comprising a motor shaft 100, a friction clutch 134, a gear train 97, and a motion transmitting means 98 (which may be a rack and pinion) and a spring member 99. The spring member may be connected between the rack and the lever 82. The shaft 100 is driven from reversible induction motor 93.

The motor 93 may be a variable speed capacitor type induction motor and includes a line winding 94, an amplifier winding 95, and a rotor 96 which may be of the squirrel-cage type. The motor winding 94 may be connected in series with a phasing condenser 101 to the same A. C. source as primary winding 33, and the amplifier winding 95 is energized from a phase sensitive amplifier 102.

The shaft 100 driven by motor 93 drives a rotor 106 of a velocity generator or dynamic transformer 103 used with pick up 92 to control the speed of motor 93. The velocity generator includes a primary winding 104 and a secondary winding 105. The primary winding 104 is connected to the ship's supply of alternating voltage and the secondary winding 105 is inductively associated with the primary winding 104 upon rotation of the rotor 106. The voltage induced in the secondary winding depends upon the speed of rotation of the rotor 106. Connected across the secondary winding 105 through a condenser 110 is a resistor 108 of an anti-hunt authority potentiometer 107 which includes a slider 109. The slider may be manually positioned along resistor 108. One end of resistor 108 is connected to ground which is common to amplifier 102.

The potentiometer 107 and the pick-off 92 are connected in series and are the source of a control voltage for amplifier 102. The amplifier 102 is if a type employing several voltage amplification stages and a final phase sensitive discriminator stage having two sets of triode tube elements, such as shown in Upton Patent 2,423,534. For simplicity of illustration, the discriminator stage only is shown and in highly simplified form. A secondary winding 128 of transformer 32 may have its opposite ends connected to the separate plates or anodes with its center tap connected to one end of the motor amplifier winding 95. The two grids are tied together and connected by conductor 90 to the adjustable member 84 of the pick-off. The two cathodes are connected together and thence grounded which is common as stated to the ground of potentiometer 107. The plates of the two triodes are oppositely energized whereas the grids have the same polarity with respect to their cathodes so that the motor amplifier winding 95 is energized in quadrature relation with respect to the energization of motor line winding 94. This quadrature relation depends upon the phase relationship of the voltage across secondary winding 128 with respect to the resultant voltage across conductor 90, which is connected to the grids, and the lower end of resistor 108 connected to ground which is common to the ground of the cathodes. A condenser 111 is connected across the amplifier winding 95 to improve the wave form of the voltage supplied to the winding.

The self balancing altitude sensing unit which as stated includes gear train 97 driven from output shaft 100 of motor 93 in turn applies the movement of rebalancing to an output shaft 112 which in addition to operating the motion transmitting means 98 also carries a driving element 114 of a magnetic clutch 113. The clutch includes a driven element 115 which may be splined on a driven shaft 118. The clutch 113 includes an operating coil 116. Upon energization of winding 116, the driven element 115 is brought into driving relationship with the driving element 114 to permit rotation of shaft 118 in accordance with the rebalancing movement of motor 93 or change in altitude from the gear train output shaft 112. The output shaft through a suitable operating connection 117 positions slider 70 of an altitude displacement signal potentiometer 68. The slider is provided with springs 75 which center the slider upon opening clutch 113. The potentiometer 68 includes a resistor 69 which is connected across a secondary winding 67 of transformer 32. Resistor 72 of the displacement authority potentiometer is connected across the center tap 74 of secondary 67 and to the adjustable slider 70. Slider 70 has its movements impeded by limit stops 59.

Connected in parallel with resistor 69 is a resistor 65 of an altitude reset signal potentiometer 64 having a slider 66. Resistor 61 of the reset authority potentiometer is connected across the slider 66 and center tap 74 of secondary winding 67. The slider 66 is positioned along resistor 65 from an output shaft 126 of a gear train 127. The gear train 127 is driven by an output shaft 129 of a reset motor 124.

The motor 124 is a capacitor type induction motor having two phase windings 130, 131 which are at one end connected together and grounded. The free ends of these motor windings have a capacitor 132 conventionally connected across them. The motor includes a rotor 133.

The direction of rotation of motor 124 and hence displacement of slider 66 in one instance is controlled by a relay 135 and for opposite rotation is controlled by a relay 141. Relay 135 includes two operable arms 137, 138. The former co-acting with an out contact 136 and the latter with an in contact 139. Relay 135 includes an operating coil 140. Relay 141 includes two operable arms 142, 143 the former being engageable with an out contact 144 and the latter with an in contact 145. Relay 141 includes an operating coil 146.

The relay coils 140, 146 are alternatively energized through a single pole double throw switch 119 having an arm 120 which may abut narrowly spaced yieldable contacts 121 or 122. The switch arm 120 is driven from the output shaft 118 from the magnetic clutch 113. The relay coils 140, 146 may be energized through a reset switch 148 comprising an operable arm 149 which may engage one or the other of yieldable spaced contacts 150, 151. This switch functions through motor 124 to return slider 66 to normal position. The relationship of the contacts to the associated arm in switches 119 and 148 is such that very little movement of the arm is required before either one or the other of its opposed contacts becomes engaged. The switch arm 149 is positioned from an operating connection 152 driven by the output shaft 126 of gear train 127. The switch arms 120 and 149 are respectively connected to an in contact 157 and to an out contact 156 of an altitude reset control relay 155. This relay additionally includes a single arm 158, co-acting with the two opposed contacts 156, 157, and an operating coil 159. The energization of the operating coil 159 of relay 155 as well as the energization of the winding 116 of the magnetic clutch 113 is controlled by a single pole single throw switch 161 having a manual operating connection 54 common to slider 52 of potentiometer 50 whereby slider 52 is moved upward from the low end of resistor 51 as switch 161 is closed.

The speed of reset motor 124 is damped by a generator 163 having field windings 164, 165 and a rotor 162 driven from the output shaft 129 of the reset motor. The field windings 164, 165 are energized from a direct voltage source comprising a voltage dividing potentiometer 166 having a resistor 167 and a slider 168. The resistor 167 is connected across a battery 154 and the adjustable tap 168 is connected to one end of both windings 164, 165. The remaining ends of the windings are connected to one end of resistor 167 and to ground.

Normally the altitude control switch 161 is in open position when the craft is not to be held to a predetermined altitude. Additionally, with the engage relay 17 in unoperated position, the elevator control surface may be operated manually until the craft reaches or achieves a desired altitude. During the time that the craft is increasing in altitude, the pressure responsive altimeter 80 will expand and rotate the lever 82 counter clockwise. This movement unbalances the pick-off or capacitor bridge 92 and results in a voltage being generated between conductors 90, 91 which is applied to the control circuit of amplifier 102. The amplifier 102 energizes the phase winding 95 of the motor 93 which thereupon rotates and through its shaft 100, gear train 97, motion transmitting means 98 adjusts the tension in spring 99 to effect rotation of lever 82 in the clockwise directon until the capacitor bridge 92 is again in balance.

The motor 93 also through its output shaft 100 drives the rotor 106 of the velocity generator 103 to induce a voltage in secondary winding 105 and thus across the voltage dividing potentiometer 107 whereby a voltage is supplied to the input circuit of amplifier 102 which opposes the voltage from capacitor bridge 92. Since motor 93 operates against a load, such as its driven elements, it does not attain maximum speed consequently its speed varies with its energization. This energization varies substantially with the rate of change of pressure in bellows 80. Thus the voltage in secondary winding 105 being proportional to the speed of motor 93 is proportional to the rate of change in altitude. This opposing voltage damps the movement of motor 93 and prevents hunting thereof about the balanced position of capacitor bridge 92. It is thus evident that the capacitor bridge 92 is kept in a balanced condition during changes in altitude while the magnetic clutch 113 is disengaged.

With the craft at the desired elevation and desired attitude, the engage relay 17 may be manually energized to connect amplifier 18 to the servo motor 13 and energize simultaneously the brake windings of the servo motor as shown in the aforesaid patent to Willis Gille et al. With the craft in a desired attitude as stated it may be assumed that the sliders 28, 31, 41, 45, 66, and 70 are at the electrical centers of their respective resistors. With the sliders thus arranged, there is no control signal to the input circuit of amplifier 18. The craft is stabilized about the pitch axis by the vertical gyro 36 which, should any change in attitude be undergone, will adjust the slider 41 along resistor 40 to change its potential with respect to the slider 45 of the potentiometer bridge 38 to unbalance the network 24. This unbalance causes the amplifier 18 to operate servo motor 13 and adjust the elevator with a simultaneous operation of slider 28 along resistor 27 to rebalance the network 24. As the aircraft moves toward the desired attitude, the vertical gyro 36 moves the slider 41 back toward its normal position at which time the network 24 is unbalanced in the opposite direction whereby the elevator servo motor moves the elevator back toward its original position. As the craft approaches its original attitude under smaller and smaller displacements of the elevator from its normal position, it eventually reaches its desired attitude with the elevator returned to normal.

When altitude control is to be utilized, the pilot closes the altitude control switch 161 and simultaneously moves slider 52 upward. He may additionally move the arm 56 of the altitude rate selector switch 55 into engagement with contact 58. The closing of switch 161 completes a circuit from battery 154, switch 161, conductor 170, relay coil 159, to ground and thence to battery ground 171. The relay coil 159 moves the arm 158 into engagement with its in contact 157 to connect arm 120 of the motor operated switch 119 to energized arm 158 connected to battery 154. Additionally, closing the altitude control switch 161 completes a circuit from battery 154, switch 161, conductor 175, clutch operating coil 116, to ground and to battery ground 171.

Should the craft change altitude at this time, without necessarily changing attitude immediately, the changes in altitude undergone which are reflected in the operation of motor shaft 100 to rebalance the capacitor bridge 92 is also transmitted by shaft 112, clutch 113, shaft 118, shaft 117, to slider 70 of the altitude displacement potentiometer 68. Additionally the shaft 118 operates the switch arm 120 of switch 119 into engagement with one or the other contacts 121, 122 depending upon the direction of change in altitude.

The displacement of slider 70 changes its potential with respect to center tap 74 to generate a voltage across resistor 72 of the voltage dividing or displacement authority potentiometer 71. The voltage between slider 73 and the right end of resistor 72 is applied across the pilot's control potentiometer resistor 51 and a portion thereof selected by the adjustable tap 52. This selected portion along with an altitude rate signal derived from potentiometer 176 between slider 178 and the grounded end of its resistor 177 is applied to the network 124 and causes unbalance of the servo motor amplifier input circuit.

Omitting for the time being the function of the reset motor 124, the unbalance of the amplifier control circuit causes the positioning of the elevator by the servo motor 13. The servo motor additionally rebalances the network 24 by adjustment of slider 28. Under the applied elevator, the craft changes its attitude to regain its original altitude. The change in attitude of the craft causes the vertical gyro to move its slider 41 to derive a signal from potentiometer bridge 38 which opposes the altitude correcting signal and causes movement of the elevator toward its original position.

As the altitude change decreases, the altimeter 80 readjusts the position of lever 82 in the opposite direction from that direction of movement applied to the lever upon the original change in altitude. This opposite movement results in opposite unbalance of bridge 92 to effect opposite rotation of instrument balance motor 93 so that slider 70 of the altitude displacement potentiometer is moved toward its original position. The altitude rate voltage from the velocity generator secondary winding 105 applied across the resistor 177 is now opposed to the voltage derived from the altitude displacement potentiometer 68. The velocity generator signal therefore at this time is of the same phase as the signal from the vertical gyroscope potentiometer 39 and the differential displacement of the elevator depends upon the difference between these two control signals and that from the altitude displacement potentiometer 68.

As the altitude change decreases, the signal from the altitude displacement potentiometer decreases and the preponderant signal from the altitude rate potentiometer 176 and the vertical gyro operated potentiometer 39 results in movement of the elevator toward its normal position. The action is continuous so that the craft upon regaining its original altitude is at its original attitude.

Should the disturbance which caused a change in altitude of the aircraft be of a permanent or continuous nature an additional control signal is applied tending to return the aircraft to its original altitude with a resulting permanently displaced elevator tending to counteract the continuous disturbing force. Thus a change in altitude, as before, causes the unbalance of capacitor bridge 92 due to the operation of altimeter 80 thereby upsetting the balance of the control circuit of amplifier 102 and causing operation of the instrument rebalance motor 93 which additionally to performing the rebalance through motion transmitting means 98 and spring 99 operates through shaft 112 and magnetic clutch 113 the slider 70 of the altitude displacement potentiometer 68.

The displacement potentiometer 68 can not effect return of the craft to its original altitude when a permanent or continuous disturbing effect is applied to the aircraft since return of the aircraft to its original altitude with the attitude remaining the same would result in the elevator being in its normal position and no counteracting force would be available to oppose the permanent disturbance. With the altitude displacement potentiometer 70 unable to return the aircraft to its original altitude the craft would assume an altitude other than that desired.

A form of control for returning the craft to its original altitude is provided in an additional arrangement. The shaft 118 in addition to moving slider 70 of the altitude displacement potentiometer 68 also operates the arm 120 of the altitude reset switch 119 into engagement with one of its opposed contacts. A circuit is thereby completed for one or the other of the relay coils 140, 146 extending from battery 154, conductor 172, conductor 173, relay arm 158, in contact 157, switch arm 120, and through one or the other of the switch contacts 121, 122 through its associated relay coil 140, 146 to ground, and to battery ground 171.

If relay operating coil 140 be energized, the arms 137 and 138 are operated. The engagement of arm 138 with the in contact 139 permits alternating voltage from the supply to pass by means of a conductor 180, in contact 139, operated arm 138, conductor 181, directly through winding 130, and through condenser 132 and opposite winding 131 of motor 124, to ground and to the supply ground (not shown). The reset motor 124, through its output shaft 129 and gear train 127 connecting means 126, positions the slider 66 of reset potentiometer 64. This movement is at a much lower rate than slider 70 is positioned by motor 93. The displacement of slider 66 alters its potential with respect to center tap 74 and this difference of potential is applied across the reset authority potentiometer 60. The voltage from the potentiometer 60 is of the same phase as that from the displacement authority voltage divider 71 and is placed in series therewith and applied through potentiometer 50 to network 24 of amplifier 18.

As long as the original altitude is not regained, the rebalance motor 93 and its output shaft 100 will not be in the same position as that when altitude control was applied; therefore, the switch arm 120 operated through the shaft 100 will be in engagement with contact 121 and reset motor 124 will continue to operate and displace slider 66 additionally.

Eventually the displacement of slider 66 generates a signal of such magnitude that the movement of servo motor 13 and rebalancing slider 28 to rebalance the circuit is of such value that the displaced elevator will cause the aircraft to regain its original altitude.

With the altitude regained, the switch arm 120 is disengaged from its contact 121, and the reset motor 124 no longer operates. At this time the signal from the reset potentiometer 64 as modified by the reset authority potentiometer 69 is balanced by a voltage from the rebalancing potentiometer 26 and the pitch change potentiometer 39 so that the elevator will have been displaced an amount sufficient to counterbalance the permanent disturbing force.

If arm 120 engages contact 122 due to an opposite change in pressure or altitude, the reset motor rotates in the opposite direction to provide the necessary opposite elevator displacement.

While the reset motor as stated has positioned the slider 66 of the reset potentiometer 64, its operation has been damped by the generator or dynamic brake 163. Additionally the reset motor 124 through gear train 127, shaft 126, and counter shaft 152 has positioned arm 149 into engagement with contact 151.

When altitude control is no longer to be applied, the pilot opens the altitude control switch 161 deenergizing the operating coil 159 of relay 155 so that arm 158 engages its out contact 156. A reset circuit for motor 124 is thereby completed extending from battery 154, conductor 172, conductor 173, arm 158, out contact 156, reset motor operated switch arm 149, contact 151, relay coil 146, to ground, and to battery ground 171. The energized relay coil 146 moves the arms 143, 142 to their operated position wherein arm 143 engages in contact 145 and arm 142 is disengaged from out contact 144. An alternating voltage from the energized conductor 180 is supplied through in contact 145, arm 143, conductor 183, directly to reset motor winding 131 and to reset motor winding 130 through condenser 132 whereby the motor 124 effects rotation of its rotor 133 in the opposite direction to return slider 66 to its center position and to move arm 149 away from its engaged contact 151.

Upon separation of the switch arm 149 and contact 151, relay coil 146 is deenergized so that its arms 142, 143 are returned to out position similar to arms 137, 138 of relay 135. With the arms 142 and 137 engaged with their out contacts 144 and 136, a circuit is completed from energized conductor 172, conductor 184, out contact 144, relay arm 142, conductor 185, relay arm 137, out contact 136, motor winding 130, to ground, and to battery ground 171 whereby a direct current voltage is applied to the motor winding 130. The effect of thus energizing winding 130 is to brake the rotation of the rotor 133 to prevent motor 124 rotating to displace switch arm 149 beyond the normal position midway of contacts 150, 151.

As stated slider 70 has its displacement limited in two directions by stops 59. With the slider 70 engaging a stop 59, clutch 134 slips whereas clutch 113 is arranged to hold. This prevents loss of altitude reference during engagement of slider 70 with either of its stops to limit the altitude change or displacement signal.

While the altitude control has been described with selector arm 56 of switch 55 engaged with contact 58, the switch arm 56 may also be engaged with contact 57 at which time the altitude rate control effect from potentiometer 176 is subject to being altered by movement of slider 52 along with the displacement and reset voltages.

It will be seen that I have provided an altitude control arrangement that effects return of the craft to a selected altitude upon departure therefrom due to a transient disturbance with reduced hunting about the selected altitude during such return and also returns said craft to the selected altitude upon departure therefrom due to a permanent disturbance tending to change altitude.

It will now be apparent that many changes in the above construction will suggest themselves and many widely different embodiments of the invention could be made without departing from the principles thereof, it is intended therefore that the above description and drawing shall be considered illustrative and not in a restrictive sense.

What is claimed is:

1. In an automatic pilot for an aircraft having attitude changing means for controlling attitude of the craft about its lateral axis, a barometric device, a pick-off operated by said device for generating a signal upon change from normal altitude of said craft, motor means connected to said pick-off and operable from a selected position corresponding with the normal altitude of the craft for zeroing said pick-off, a first signal generator for providing a signal proportional to the change in altitude, a second signal generator for providing a signal proportional to the duration of the said change in altitude, drive means connecting the motor means and said first generator to provide a signal proportional to said change, further means operatively connected to the second signal generator and controlling the same for deriving a signal therefrom and responsive to continued departure of said motor means from its selected position, and signal responsive means connected to both generators and controlled by both generators for operating the said attitude changing means to restore the craft to the normal altitude.

2. Apparatus as in claim 1, wherein said drive means effects control of said further means by said motor means and includes a disconnectible clutch for disconnecting said first generator and said further means from said motor means to permit change in craft altitude and change in altitude control position of said motor means.

3. Apparatus as in claim 1, wherein said drive means operates a third signal generator for producing a signal proportional to the rate of change of altitude, and means for additionally operating said signal responsive means from said third generator.

4. Control apparatus for an aircraft comprising a vertical gyroscope, a signal generating means cooperating with said gyroscope for producing an alternating signal voltage corresponding in phase and magnitude to the sense and magnitude of pitch of said aircraft with respect to said vertical gyroscope, an altimeter, signal generating means cooperating with said altimeter for producing a second alternating signal voltage corresponding in phase and magnitude to the direction and magnitude of departure of said aircraft from a predetermined altitude, signal generating means cooperating with said altimeter for producing a third alternating signal voltage corresponding in phase and magnitude to the direction and duration of departure of said craft from a predetermined altitude, means for combining said signal voltages, servo means adapted to operate a control surface of said craft for changing the attitude of said craft in pitch to return said craft to level flight at said predetermined altitude, and means for controlling said servo means from said combining means.

5. Control apparatus for an aircraft having an elevator control surface comprising: attitude means for producing a first signal voltage proportional to magnitude and direction of departure of said craft from a predetermined attitude; altitude responsive means; a second signal means controlled by the altitude means for producing a signal voltage proportional to magnitude of change of altitude of said craft; a third signal means controlled by said altitude means for producing a signal voltage proportional to the rate of change of altitude of said craft; a fourth signal means controlled by said altitude means for producing a signal voltage proportional to the duration of change of altitude of said craft; means for combining said four voltages; operating means for said surface connected to said combining means and controlled thereby to maintain said craft at said predetermined attitude and at said predetermined altitude; disabling means for rendering said altitude means ineffective for further controlling said second and fourth signal generators; further means for rendering said second signal generator ineffective in said combining means during subsequent changes in altitude; and means for retaining in said combining means said first signal and said fourth control signal to prevent sudden loss of altitude on operation of said disabling means.

6. Altitude control apparatus for an aircraft comprising, an altimeter, a voltage generating pick-off having a displaceable sensitive element actuated by said altimeter from a null position and providing a voltage varying with said displacement, a variable speed motor drivably connected to said pick-off for altering the position of said sensitive element, means connected to said pick-off and to said motor for controlling said variable speed motor from said pick-off, additional means including a first signal generator driven by said motor for generating a voltage proportional to the speed of operation of said motor and therefore in accordance with the rate of change of altitude, a servo motor for operating an elevator of said aircraft, a rebalancing signal generator driven by said servo motor, and means for controlling said servo motor from said first signal generator and from said rebalance signal generator.

7. Control apparatus for an aircraft having a control surface movable with respect thereto for controlling said craft about its pitch axis, an altimeter, signal means on said craft operated by said altimeter for generating an electric signal in proportion to the departure of said craft from a predetermined altitude, a servo motor for operating said control surface, further means connected to said signal means and to said servomotor for energizing said motor under the control of said first signal, means driven by said motor for producing an electric follow-up signal proportional to relative displacement of said control surface and said craft and connected to said further means for modifying the effect of said first signal on operation of said servomotor, a reset motor operatively controlled from said altimeter during such departure, and means driven by the reset motor for producing a reset signal in accordance with the duration of operation of said reset motor and connected to the further means for modifying the operation of said control surface by said servo motor.

8. Control apparatus for an aircraft having attitude changing means for controlling said craft about its pitch axis, a servo motor for operating said attitude changing means, altimeter means on said craft responsive to changes in altitude, signal means connected to the altimeter means and operated by said altimeter means for generating a signal in proportion to the change in altitude of said craft from a predetermined position, means for producing a follow up signal upon operation of the attitude changing means, a reset signal generator controlled from said altimeter means during said altitude change for generating an electric signal proportional to the duration of said change in altitude, and signal combining means controlled by said signal means, said follow up signal, and said reset signal for controlling said servo motor.

9. In an automatic steering apparatus for an aircraft having an elevator control surface movable with respect to said craft for controlling said craft about its pitch axis, a servomotor adapted for operating said control surface, altimeter operated means connected to said servo motor for effecting operation of said servo motor upon displacement change in altitude, follow up means operated by said servo motor for modifying the operation of said servo motor by said altimeter means, and reset means controlled by said altimeter means and operable in accordance with the duration of said displacement change in altitude for further modifying operation of said servo motor whereby the servo motor is operated in accordance with the altitude displacement and duration of altitude displacement.

10. An altitude controller for controlling the elevator surface of an aircraft for maintaining said aircraft flight at a predeetrmined altitude level comprising: a signal generator adapted to respond to an altimeter and operable thereby from a non-signal generating position for developing a signal when the flight of said craft departs from a predetermined altitude, means operatively connected thereto and normally yieldably urging said generator to said non-signal generating position, motor means connected to the yieldable mans and controlled by said signal generator and operable from a normal position for adjusting said yieldable means for maintaining said generator in a null position, a second signal generator driven by said motor means for developing a signal in proportion to the extent of motor operation from its normal position, a servo motor for operating said elevator of said craft, further means connected to said second signal generator and said servo motor for controlling said servo motor from said second signal generator, a reset motor responsive to displacement of said motor means and operated in accordance with the duration of displacement of said motor means from said normal position, a third signal generator operated by said reset motor to develop a signal in accordance with the duration of its operation, and means connecting the third generator to the further means for modifying operation of said servo motor from said reset signal.

11. An altitude controller for operating the elevator surface of an aircraft comprising a movable signal generator for developing a signal when the craft departs from a predetermined altitude, means responsive to pressure changes due to changes in altitude of said craft for operating said signal generator from a non-signal position, a motor controlled from said signal generator for positioning said signal generator in a non-signal position at a rate depending upon the magnitude of said signal, means controlled from said motor for developing a second signal in accordance with the extent of change in altitude, means driven by said motor for generating a third signal proportional to the rate of operation of said motor and therefore to the rae of change of altitude, and means controlled by said second and third signals for operating the elevator of said craft.

12. An automatic altitude and attitude control for an aircraft comprising, an altimeter responsive to changes in altitude of said aircraft, a pick-off on said aircraft having a sensitive element actuated by said altimeter, a motor controlled by said pick-off operable at a rate depending upon displacement of said pick-off from a normal position for operating said sensitive element to place said pick-off in a normal non-signal position, a signal voltage generator driven by said motor and developing a signal proportional to the rate of operation of said motor, a vertical gyroscope responsive to changes in pitch attitude of said aircraft, a second signal voltage generator operated from said vertical gyroscope, a servo motor for operating an elevator control surface of said aircraft, a follow-up signal voltage generator driven by said servo motor, and voltage responsive means connected to the generators controlled by said first and second generated signals and modified by said follow-up signal for controlling said servo motor.

13. In apparatus for controlling the attitude of an aircraft having an elevator control surface about its pitch axis in combination, electric motor means adapted to operate the elevator of said aircraft to control its attitude, means including a control circuit connected to said electric motor means for controlling the extent of operation of the electric motor means, an altimeter responsive to pressure changes due to change in altitude of said craft, signal providing means operated by said altimeter and said electric motor means for supplying in said input circuit a signal having an effect dependent upon the differential extent of operation of said altimeter and said electric motor means, and additional means in said circuit responsive to the speed of operation of the electric motor means to supply a signal to said input circuit to oppose the effect of the signal providing means resulting from operation thereof by said altimeter.

14. Apparatus for controlling the flight of an aircraft comprising, a servo motor adapted to operate pitch attitude changing means of said aircraft, control means connected to said servo motor and responsive to the magnitude of change of altitude and to the rate of change of altitude of the aircraft from a predetermined level to cause the servo motor to operate the attitude changing means to return the aircraft to said predetermined altitude, a follow-up controller in said control means operated by said servo motor, and further means in said control means responsive to the duration of the departure in altitude from said predetermined altitude for further controlling said servo motor for maintaining the predetermined altitude of said aircraft.

15. In control apparatus for an aircraft having an elevator control surface, an altimeter responsive to changes in altitude undergone by said craft, a pick-off having a sensitive element positioned by said altimeter for producing a control signal, means for amplifying said signal, reversible motor means operable from a normal position and controlled from said amplifier and connected for actuating said sensitive element to place said pick-off in a no-signal position, potentiometer means actuated from said motor for producing a second control signal proportional to its extent of operation, a reset motor operated by said reversible motor means in accordance with the duration of operation of said reversible motor means from said normal position, a second potentiometer means actuated from said reset motor, and means for controlling the position of the elevator of said aircraft and controlled from said first and second potentiometer means.

16. Automatic altitude control apparatus for an aircraft comprising, an altimeter responsive to changes in pressure due to changes in altitude of said aircraft from a predetermined value, control means including a two part pick-off having one part actuated from said altimeter to provide a control signal, a servo motor connected to said control means and controlled from said pick-off and adapted to reposition said part so that said pick-off is in a no-signal position, a second pick-off having an adjustable part, operating means for said second pick-off including disconnectible clutch means between said adjustable part and said motor, additional means including a second motor controlled from said second pick-off, potentiometer means adjusted by said second motor, a servo motor adaped for operating an elevator of said aircraft, and further means for controlling operation of said servo motor and connected to be responsive to said potentiometer means.

17. Altitude control apparatus for an aircraft having an elevator control surface, said apparatus comprising: an altimeter responsive to change in pressure; a first signal generator displaced from a null position by said altimeter; means controlled by said generator and operatively coupled thereto through a slip clutch for restoring said signal generator to a null position; a second signal generator; means for adjusting said second signal generator from said restoring means through a driving connection including the driven element of said slip clutch whereby said second signal generator is adjusted in accordance with a change in altitude; operating means including a motor for positioning said elevator, further means adapted to be controlled by said second signal generator for effecting displacement of said operating means in accordance with the magnitude of said second signal; stop means for limiting the maximum adjustment of said second signal generator by said restoring means, said slip clutch preventing effective operation of said first signal generator by said restoring means while said second signal generator remains in maximum adjusted position to prevent loss of altitude reference.

18. Control apparatus comprising a device for controlling a condition; sensitive means responsive to a change in said condition; a first signal generator displaced from a null position by said sensitive means; motor means controlled by said signal generator; drive means including a slip clutch connecting said motor means and signal generator for returning said generator to said null condition; a second signal generator; stop means for limiting the adjustment of said second signal generator; an operating connection including said slip clutch between said motor means and said second signal generator whereby said generator is normally positioned in accordance with the change in condition, means connected to the second signal generator and responsive to said second signal for operating said condition controlling device; all whereby during large changes in said condition when said second generator adjustment is impeded by said stop means said clutch slips terminating operation of both said first and second signal generators by said motor means to prevent moving said first generator to null position to thus prevent loss of reference.

19. Altitude maintaining means for an aircraft comprising: motor means adapted to operate a pitch attitude changing means of said craft to change altitude thereof; altitude sensitive means responsive to changes in pressure upon departure of said craft from a predetermined altitude; a signal generator; drive means including a slip clutch for drivably connecting said altitude sensitive means and said generator; stop means for limiting the maximum adjustment of said generator from said altitude sensitive means; signal responsive means connected to said generator and to the motor means for operating said attitude changing means in proportion to the magnitude of signal from said generator; a second signal generator having an output proportional to its extent of adjustment connected to the signal responsive means for controlling said motor means; and means in said drive means positioned prior to limited adjustment of said generator by said stop means for adjusting said second signal generator continuously during slippage of said clutch due to engagement of said signal generator with its stop means.

References Cited in the file of this patent

UNITED STATES PATENTS

| | | |
|---|---|---|
| 1,703,280 | Minorsky | Feb. 26, 1929 |
| 1,966,170 | Greene | July 10, 1934 |
| 2,143,139 | Carlson et al. | Jan. 10, 1939 |
| 2,401,168 | Kronenberger | May 28, 1946 |
| 2,415,429 | Kellogg et al. | Feb. 11, 1947 |
| 2,464,629 | Young | Mar. 15, 1949 |
| 2,474,618 | Divoll | June 28, 1949 |
| 2,553,597 | Maroni | May 22, 1951 |
| 2,567,831 | Turner | Sept. 11, 1951 |
| 2,576,135 | Moseley | Nov. 27, 1951 |
| 2,634,925 | Kutzler | Apr. 14, 1953 |
| 2,686,022 | Hanna et al. | Aug. 10, 1954 |